United States Patent
Fukuyama et al.

(10) Patent No.: US 6,304,708 B1
(45) Date of Patent: Oct. 16, 2001

(54) OPTICAL FIBER ARRAY AND PRODUCTION METHOD THEREOF

(75) Inventors: Masashi Fukuyama, Komaki; Hironori Kurimoto, Kounan, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/262,822

(22) Filed: Mar. 5, 1999

(30) Foreign Application Priority Data

Mar. 19, 1998 (JP) .................................... 10-070657
Mar. 2, 1999 (JP) .................................... 11-054535

(51) Int. Cl.[7] .................................................. G02B 6/00
(52) U.S. Cl. ................................ 385/137; 385/33; 385/83
(58) Field of Search ....................... 385/76–78, 65, 385/69, 80, 83, 85, 49, 51, 129–132, 137

(56) References Cited

U.S. PATENT DOCUMENTS

| | | | |
|---|---|---|---|
| 5,136,678 | * | 8/1992 | Yoshimura ........................... 385/132 |
| 5,420,952 | * | 5/1995 | Katsura et al. ........................ 385/80 |
| 5,446,815 | * | 8/1995 | Ota et al. .............................. 385/83 |
| 5,482,585 | * | 1/1996 | Ota et al. .............................. 385/158 |
| 5,513,290 | * | 4/1996 | Ishikawa et al. ....................... 385/49 |
| 6,027,253 | * | 2/2000 | Ota et al. .............................. 385/83 |
| 6,160,937 | * | 12/2000 | Fukuyama et al. ................... 385/137 |

FOREIGN PATENT DOCUMENTS 0 564 207 A2   10/1993 (EP).
0 573 288 A2   12/1993 (EP).
0 611 142 A1    8/1994 (EP).

* cited by examiner

*Primary Examiner*—Frank G. Font
*Assistant Examiner*—Sang H. Nguyen
(74) *Attorney, Agent, or Firm*—Burr & Brown (57) ABSTRACT

An optical fiber array has an upper substrate, a lower substrate where a V-groove is formed, and optical fibers inserted and arranged on the V-groove, the upper substrate and the lower substrate being fixed with an adhesive, and the optical fibers being fixed and aligned on the V-groove. In the optical fiber array, the upper substrate has a fiber presser substrate for pressing the optical fibers on the V-groove and a coated fiber housing substrate for housing coated optical fibers, and a housing groove for coated-optical fibers and an adhesive inflow groove portion in the direction of a fiber axis are formed in the coated fiber housing substrate. An optical fiber array is a half-pitched optical fiber array having two levels of coated optical fibers. The adhesive is composed of a first adhesive for bonding the fiber presser substrate and the lower substrate and a second adhesive for bonding the coated optical fiber between the coated fiber housing substrate and the lower substrate, and the first adhesive has a Young's modulus larger than the second adhesive.

15 Claims, 8 Drawing Sheets

OPTICAL FIBER ARRAY AND PRODUCTION METHOD THEREOF

BACKGROUND OF THE INVENTION AND RELATED ART STATEMENT

The present invention relates to an optical fiber array constructed by arranging and fixing an optical fiber in a V-groove and a production method thereof.

Recently, with the densification of optical fibers, movement to multifilamantary planar waveguides (PLCs) has been accelerated. Furthermore, with the movement to multifilamantary planar waveguides, development has been advanced in the direction of shortening conventional standard pitches of the waveguides so as to avoid waveguide elements from upsizing and to achieve densification. Moreover, with the densification of optical fibers and shortening of waveguide pitches, pitches between fibers of optical fiber arrays that are connected to optical fibers have been also shortened in the development of fibers.

Figure 9:
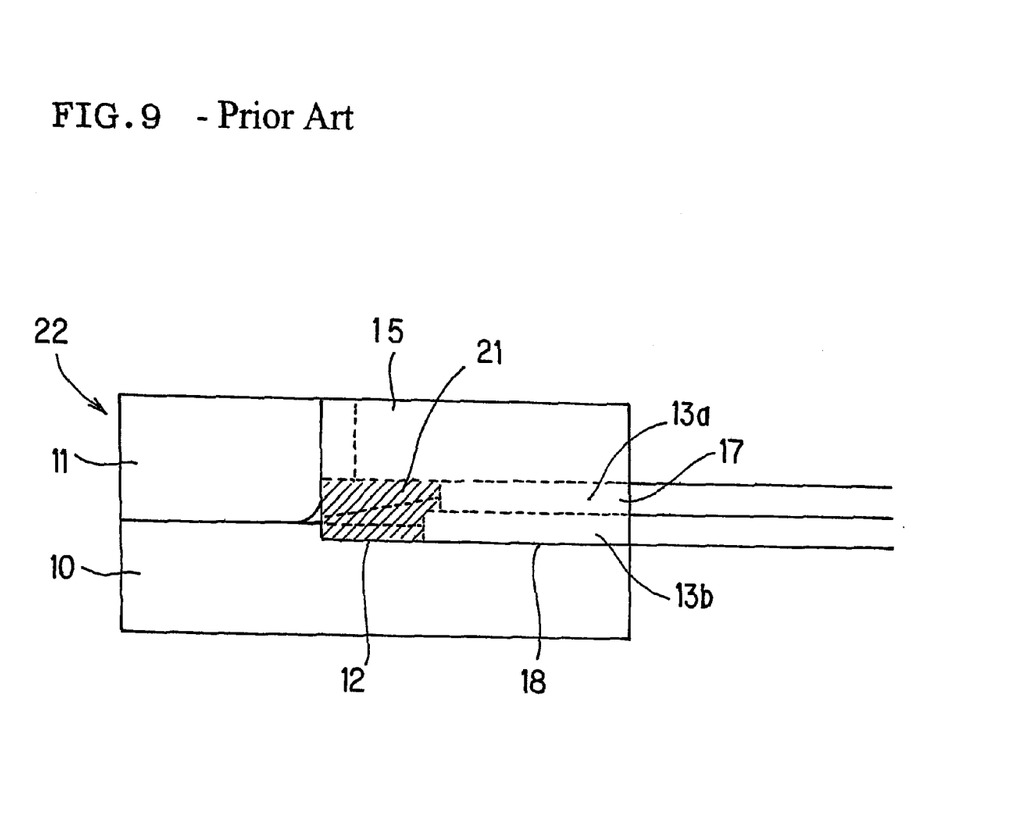
FIG. 9 is a front view showing an example of a conventional half-pitched optical fiber array.

FIG. 9 shows an example of a half-pitched fiber array whose pitches each are shortened to a half of a conventional pitch.

In FIG. 9, a lower substrate 10 having a V-groove and a coated fiber housing substrate 15 are adhesively fixed with each other from above a step portion 12 of the lower substrate 10. Coated fibers 13a and 13b are inserted with being piled in two levels from a coat housing groove 17 formed in the coated fiber housing substrate 15, and respective fibers in lower and upper levels are alternately aligned in the V-groove. Next, by attaching an upper substrate (fiber presser substrate) 11 from above the V-groove of the lower substrate 10 and fixing the upper substrate 11, an optical fiber array 22 is produced.

In the above case, after optical fibers are inserted between the upper and lower substrates, an ultraviolet hardening-type adhesive is injected into gaps of these upper and lower substrates and optical fibers. Next, ultraviolet rays are applied to harden the ultraviolet hardening-type adhesive and to fix the upper and lower substrates and optical fibers.

Although hardening of this adhesive is performed by applying ultraviolet rays to the adhesive, usually, the adhesive is hardened by applying the ultraviolet rays to the entire optical fiber array from above the optical fiber array.

Nevertheless, if the ultraviolet rays are applied to the entire optical fiber array as described above, the adhesive shrinks at the time of hardening. Therefore, since the adhesive over the entire optical fiber array is hardened at the same time, stress (distortion) corresponding to a product of the shrinkage of the adhesive used and the Young's modulus remains behind. This stress generates minute peeling within a boundary between the upper and lower substrates and adhesive, and this peeling may become a factor of degrading reliability from the long-term perspective. In addition, even if the peeling cannot be found, residual stress may exist with a high probability, and hence, such a state also has a possibility of becoming a factor raising a problem on long-term reliability.

Furthermore, in FIG. 9, a filling amount of a first adhesive between the lower substrate 10 and upper substrate 11 is largely different from that of a second adhesive injected into an upper gap (coat housing portion) of the step portion 12 that exists between the lower substrate 10 and coated fiber housing substrate 15. In consequence, there was a problem that residual stress by the shrinkage at the time of the adhesive being hardened also becomes extremely large in a second adhesive portion.

SUMMARY OF THE INVENTION

The present invention is performed in consideration of such conventional problems. An object of the present invention is to provide an optical fiber array, which has no loss and excellent long-term reliability by suppressing residual stress in the optical fiber array as much as possible at the time of fixing an optical fiber with hardening adhesives, and a production method thereof.

According to the present invention, there is provided a production method of an optical fiber array comprising an upper substrate and a lower substrate where a V-groove is formed, the production method which comprises steps of inserting and arranging an optical fiber on the V-groove, fixing the upper substrate and the lower substrate with an adhesive, and fixing and aligning the optical fiber on the V-groove, wherein an ultraviolet hardening-type adhesive is hardened by applying ultraviolet rays to the V-groove in parallel from on an extension line of an optical fiber axis with the optical fiber being inserted and aligned between the upper and lower substrates and the ultraviolet hardening-type adhesive being injected into gaps between these upper and lower substrate and optical fiber.

In addition, the present invention provides a production method of an optical fiber array comprising an upper substrate, which is composed of a fiber presser substrate for pressing an optical fiber on a V-groove and a coated fiber housing substrate for housing an coated fiber, and a lower substrate where the V-groove is formed, the production method which comprises steps of inserting and arranging an optical fiber on the V-groove, fixing the upper substrate and lower substrate with an adhesive, and fixing and aligning the optical fiber on the V-groove, the production method further comprising sequential steps of: inserting and arranging the optical fiber between the upper and lower substrates; injecting the ultraviolet hardening-type adhesive into gaps between these upper and lower substrate and optical fiber; and hardening the ultraviolet hardening-type adhesive by applying ultraviolet rays to the V-groove in parallel from on an extension line of an optical fiber axis.

Furthermore, the present invention provides a production method of an optical fiber array comprising an upper substrate and a lower substrate where a V-groove is formed, the production method which comprises steps of inserting and arranging an optical fiber on the V-groove, fixing the upper substrate and lower substrate with an adhesive, and fixing and aligning the optical fiber on the V-groove, the production method further comprising sequential steps of: inserting and arranging the optical fiber between the upper and lower substrates; injecting an ultraviolet hardening-type adhesive into gaps between these upper and lower substrate and optical fiber, the ultraviolet hardening-type adhesive being composed of a first adhesive for bonding the optical fiber on the V-groove between the upper and lower substrate and a second adhesive for bonding the coated optical fiber between the upper and lower substrate, the first adhesive having a Young's modulus larger than the second adhesive; and hardening the ultraviolet hardening-type adhesive by applying ultraviolet rays to the V-groove in parallel from on an extension line of an optical fiber axis.

In the above method, it is preferable to harden the ultraviolet hardening-type adhesive by applying the ultraviolet rays in the direction from the bare optical fiber to the coated optical fiber. In addition, it is preferable that the optical fiber array is a half-pitched optical fiber array having two levels of coated optical fibers.

In addition, the present invention provides an optical fiber array which comprises an upper substrate, a lower substrate where a V-groove is formed, and optical fibers inserting and arranging on the V-groove, the upper substrate and the lower substrate being fixed with an adhesive, and the optical fibers being fixed and aligned on the V-groove, wherein the upper substrate comprises a fiber presser substrate for pressing the optical fibers on the V-groove and a coated fiber housing substrate for housing the coated optical fibers, and wherein a housing groove for coated-optical fibers and an adhesive inflow groove portion in the direction of a fiber axis are formed in the coated fiber housing substrate.

Furthermore, the present invention provides an optical fiber array which comprises an upper substrate, a lower substrate where a V-groove is formed, and optical fibers inserting and arranging on the V-groove, the upper substrate and the lower substrate being fixed with an adhesive, and the optical fibers being fixed and aligned on the V-groove, wherein the adhesive is composed of a first adhesive for bonding the optical fibers on the V-groove between the upper substrate and the lower substrate and a second adhesive for bonding the coated optical fibers between the upper substrate and the lower substrate, and wherein the first adhesive has a Young's modulus larger than the second adhesive.

Moreover, the present invention provides an optical fiber array which comprises an upper substrate, a lower substrate where a V-groove is formed, and optical fibers inserting and arranging on the V-groove, the upper substrate and lower substrate being fixed with an adhesive, and the optical fibers being fixed and aligned on the V-groove, wherein the upper substrate comprises a fiber presser substrate for pressing the optical fibers on the V-groove and a coated fiber housing substrate for housing the coated optical fibers, the adhesive is composed of a first adhesive for bonding the fiber presser substrate and the lower substrate and a second adhesive for bonding the coated optical fibers between the coated fiber housing substrate and the lower substrate, and wherein the first adhesive has a Young's modulus larger than the second adhesive.

It is preferable that the optical fiber array is a half-pitched optical fiber array having two levels of coated optical fibers.

BRIEF DESCRIPTION OF THE DRAWINGS

FIGS. 3(a) and 3(b) are schematic configurations showing an example of a standard optical fiber array of the present invention that has one level of coated fiber.

FIGS. 4(a) and 4(b) are schematic configurations showing an example of a half-pitched optical fiber array of the present invention that has two levels of coated fibers.

FIGS. 5(a) and 5(b) are schematic configurations showing another example of a half-pitched optical fiber array of the present invention that has two levels of coated fibers.

FIGS. 6(a), 6(b), and 6(c) are schematic configurations showing an example of using two kinds of adhesives in an optical fiber array of the present invention.

FIGS. 8(a) and 8(b) are schematic diagrams showing another embodiment of an irradiation method in an optical fiber array of the present invention.

DETAILED DESCRIPTION OF PREFERRED EMBODIMENT

Although embodiments of the present invention will be described below in detail with reference to drawings, the present invention is not limited to these embodiments.

Figure 1:
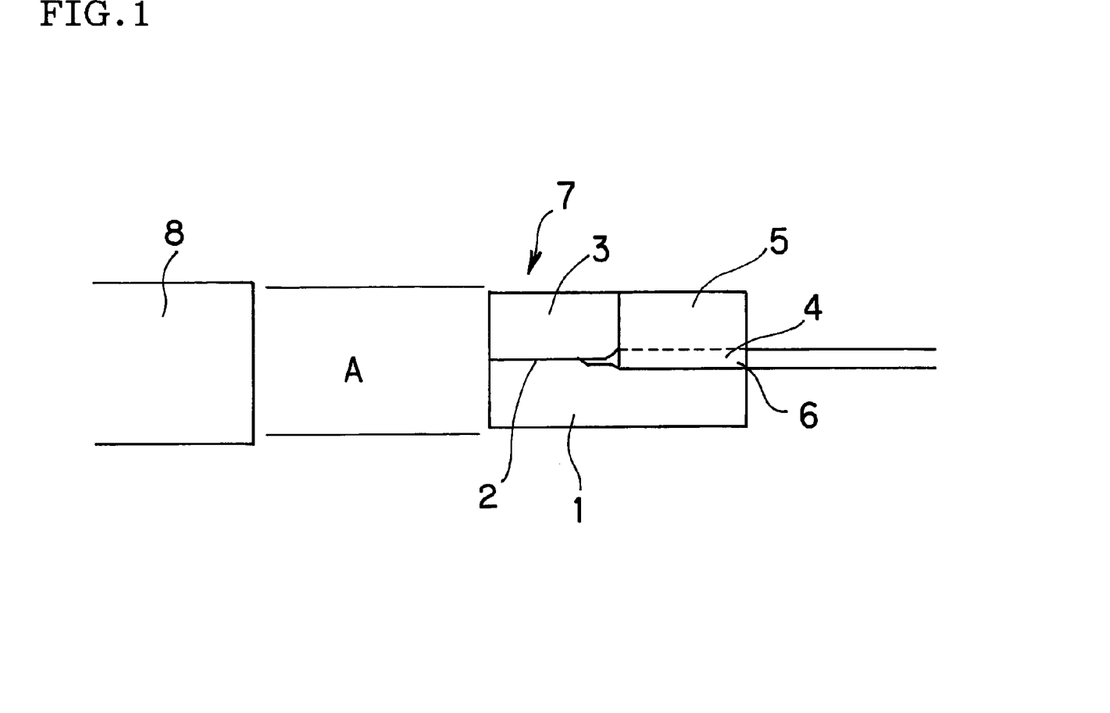
FIG. 1 a schematic diagram showing an embodiment of an irradiation method in an optical fiber according to the present invention.
Figure 2:
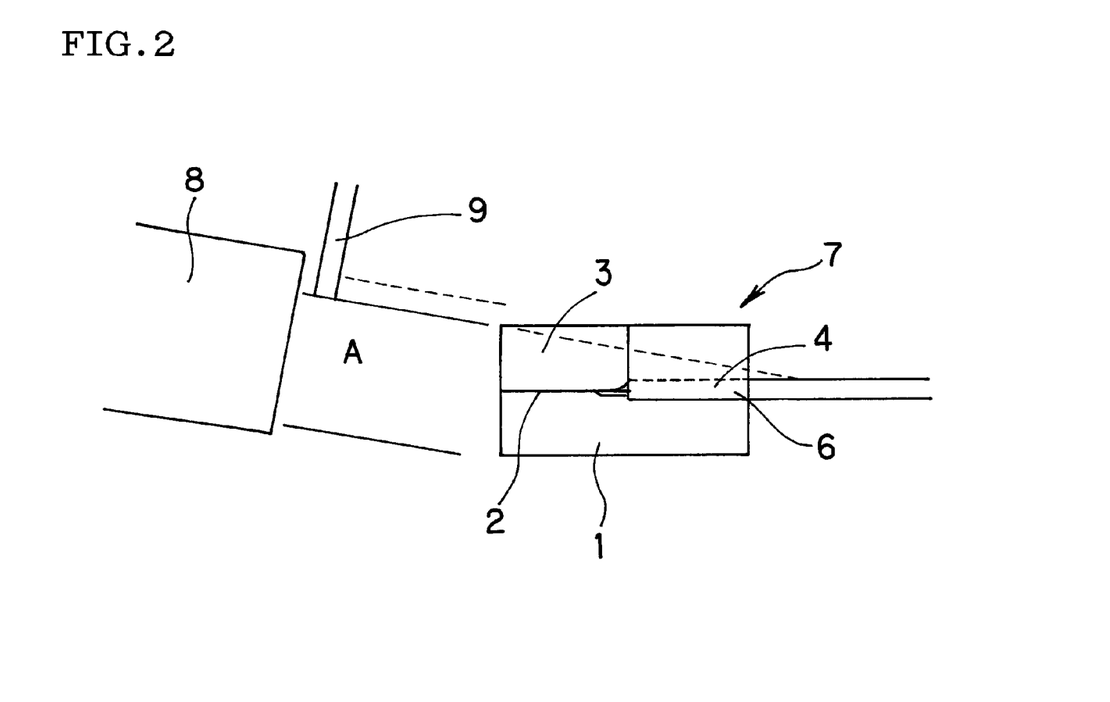
FIG. 2 is a schematic diagram showing another embodiment of an irradiation method in an optical fiber according to the present invention.

FIGS. 1 and 2 are schematic diagrams each showing an embodiment of an irradiation method in an optical fiber array of the present invention.

In FIG. 1, the optical fiber array 7 comprises a lower substrate 1 having a V-groove formed on a surface thereof, a fiber presser substrate 3 that is located above the V-groove of the lower substrate 1 and presses an uncoated (bare) optical fiber 2 on the V-groove, and a coated fiber housing substrate 5 for housing a coated fiber 4, the optical fiber array which is constructed by inserting an optical fiber from a coat housing groove 6 formed in the coated fiber housing substrate 5, and aligning the bare optical fiber 2 on the V-groove.

An ultraviolet hardening-type adhesive is injected with using a capillary action into gaps between the upper substrate (the fiber presser substrate 3 and coated fiber housing substrate 5), lower substrate 1, and optical fiber (the bare optical fiber 2 and coated optical fiber 4).

Next, a ultraviolet curing unit 8 is provided on an extension line of an optical fiber axis, that is, the extension line of the optical fiber axis that is a line in front of (in the left to the drawing of) the bare optical fiber 2. Ultraviolet rays A are applied from this ultraviolet-curing unit 8 toward the bare optical fiber 2 aligned on the V-groove to harden the adhesive.

In this manner, when the ultraviolet rays A are applied from on the extension line of the optical fiber axis toward the optical fiber, the ultraviolet rays A pass through the optical fiber array 7. Hardening of the ultraviolet hardening-type adhesive sequentially proceeds from a part of the bare optical fiber 2 on the V-groove to a part of the coated optical fiber 4. In this case, even if hardening-shrinkage of the adhesive arises, the unhardened adhesive which exists in the part after the shrunk part is supplied to the shrunk part. Therefore, hardening of the adhesive proceeds from the front part (a front end face of the bare optical fiber 2) toward the coated optical fiber 4 (the rear part) without distortion.

In consequence, stress does not remain behind in the optical fiber array 7 also after hardening of the adhesive, and hence it is possible to obtain an optical fiber array having extremely high reliability.

In addition, this effect occurs not only in a V-groove portion of the optical fiber array but also in a coat housing groove part housing the coated optical fiber.

Furthermore, even if the ultraviolet curing unit 8, as shown in FIG. 2, is located with shifting from on the extension line of the optical fiber axis and the direction of applying the ultraviolet rays inclines in some degree, the same effect as that in FIG. 1 can be demonstrated. Moreover, a blind 9 prevents the ultraviolet rays from being applied to the optical fiber array 7 from above the optical fiber array 7.

Nevertheless, it is necessary to incline the ultraviolet curing unit 8 within a degree of an unhardened part not arising inside the adhesive by the ultraviolet rays A being reflected on a surface of the optical fiber array 7. In addition, if an oblique angle of the ultraviolet curing unit 8 from the extension line of the optical fiber axis is excessively large, a part arises, the part where the luminous energy of the ultraviolet rays A applied to the optical fiber array 7 from above the optical fiber array 7 in FIG. 2 is larger than the luminous energy of the ultraviolet rays A applied from the front part of the optical fiber array 7 through the optical fiber array 7. Therefore, this part may be hardened first. Hence, it is necessary to incline the optical fiber array 7 within a degree of such a phenomenon not arising.

Figure 3A:
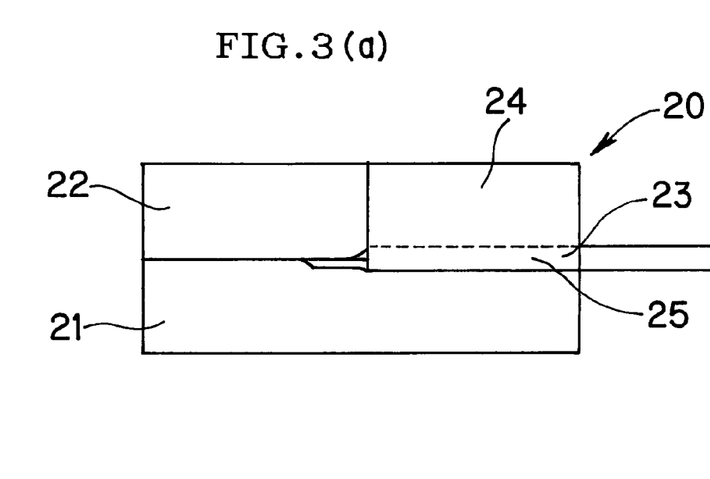
FIG. 3(a) is a front view.
Figure 3B:
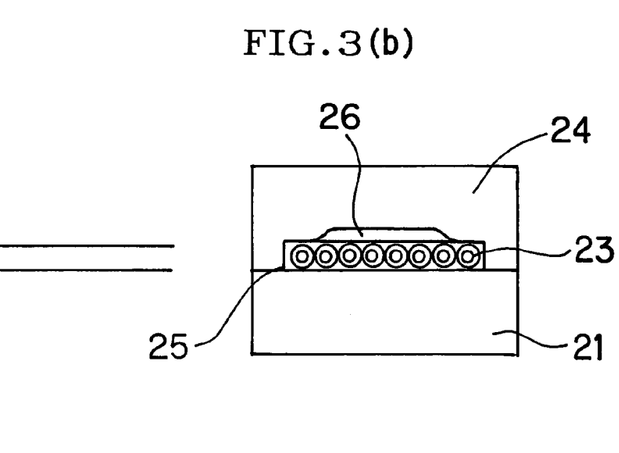
FIG. 3(b) is a right side view.
Figure 4:
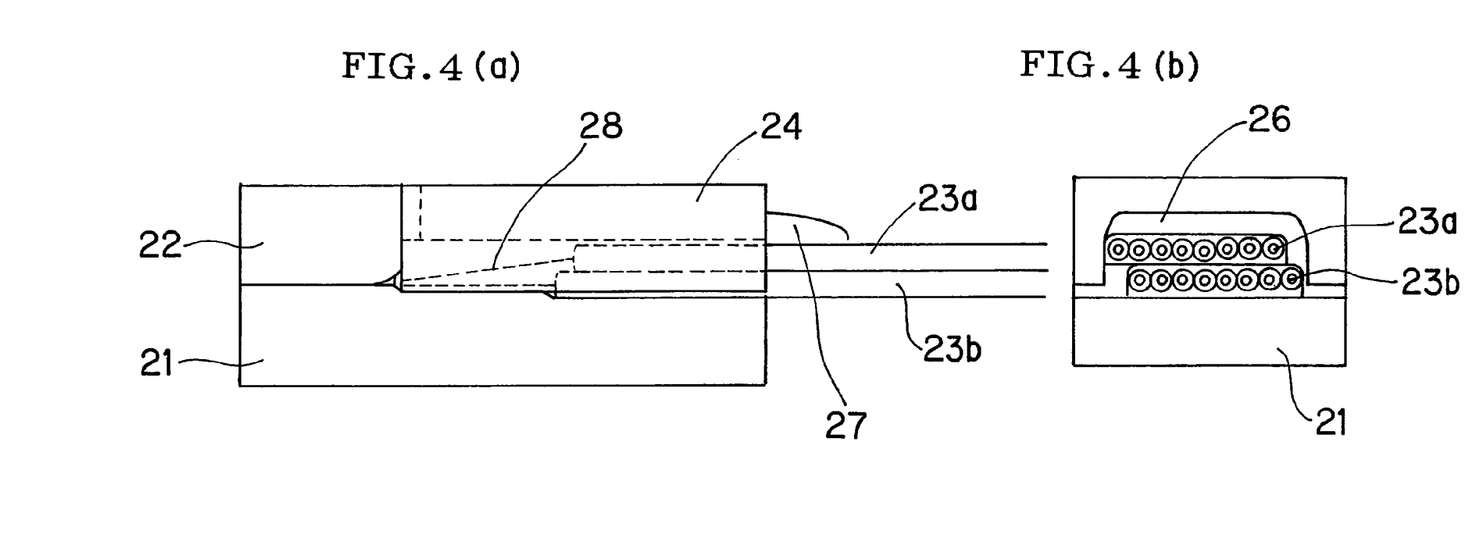
FIG. 4(a) is a front view.
FIG. 4(b) is a right side view.
Figure 5:
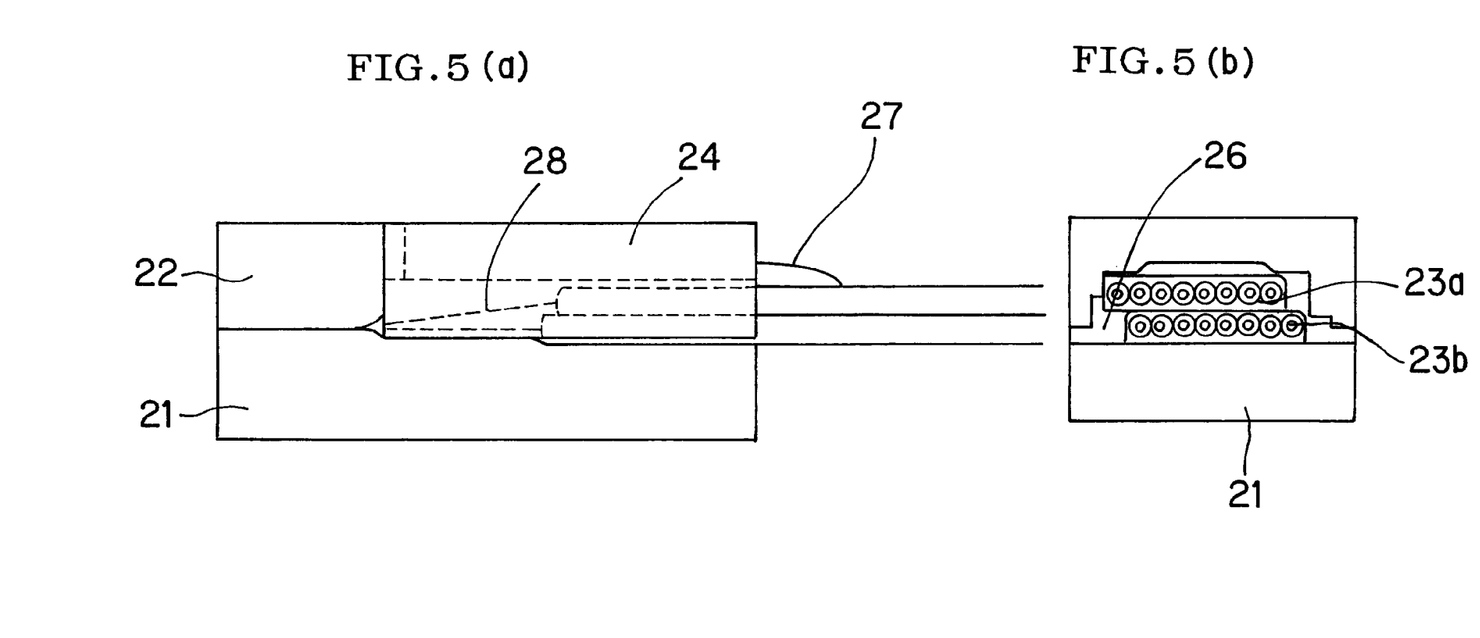
FIG. 5(a) is a front view.
FIG. 5(b) is a right side view.

FIGS. 3(a) and 3(b) are schematic configurations showing an example of a standard optical fiber array of the present invention that has one level of coated fiber, FIG. 3(a) is a front view, and FIG. 3(b) is a right side view. FIGS. 4(a) and 4(b) are schematic configurations showing an example of a half-pitched optical fiber array of the present invention that has two levels of coated fibers, FIG. 4(a) is a front view, and FIG. 4(b) is a right side view. Furthermore, FIGS. 5(a) and 5(b) are schematic configurations showing another example of a half-pitched optical fiber array of the present invention that has two levels of coated fibers, FIG. 5(a) is a front view, and FIG. 5(b) is a right side view.

In FIGS. 3(a) and 3(b), an optical fiber array 20 comprises a lower substrate 21 having a V-groove formed on a surface thereof, a fiber presser substrate 22 that is located above the V-groove of the lower substrate 21 and presses an uncoated (bare) optical fiber on the V-groove, and a coated fiber housing substrate 24 for pressing a coated optical fiber 23. In addition, the coated optical fiber 23 is inserted from a coated housing groove 25 formed in the coated fiber housing substrate 24, and the bare optical fiber that is an end portion of the fiber 23 is aligned on the V-groove. After the optical fiber is inserted into and aligned on the V-groove in this manner, an adhesive is injected into gaps between the fiber presser substrate 22 and coated fiber housing substrate 24, which construct an upper substrate, the lower substrate 21, and bare optical fiber and coated optical fiber 23. Furthermore, as described above, the adhesive is hardened by being irradiated with ultraviolet rays, and the optical fiber array 20 is completed.

In this embodiment, as shown in FIG. 3(b), not only the coated housing groove 25 but also an adhesive inflow groove portion 26 in the direction of the optical fiber axis are formed in the coated fiber housing substrate 24.

Thus, as described with reference to FIGS. 1 and 2 in the above description, it is effective for realizing the hardening of an adhesive with little residual stress to continuously supply the adhesive compensating the hardening shrinkage of the adhesive.

Then, in order to actively function this point, the adhesive inflow groove portion (hole portion) 26 is provided in a part of the coated housing groove 25 that becomes a supply source of the adhesive in the rear portion of the optical fiber array 20. It is preferable that the direction of the adhesive being supplied, that is, the direction of the groove port 26 is in parallel to the direction of the ultraviolet rays being applied.

In addition, the reason why such an adhesive inflow groove portion 26 is provided in the coated housing groove 25 is that peeling and the like remarkably arise in this part of the coated housing groove 25 where a large amount of adhesive exists. Even if the hardening shrinkage arises in a V-groove portion (including an upper surface portion of the V-groove), the adhesive exists only in the space of the gap between the V-groove and optical fiber, and hence a small amount of adhesive can be supplied. On the other hand, the coat-housing groove 25 has a large space and needs a large amount of adhesive to be supplied, and hence it is effective to provide such an adhesive inflow groove portion 26.

In addition, if an adhesive 27, as shown in FIG. 4(a), is applied in the rear portion of the adhesive inflow groove portion 26, the adhesive 27 is supplied from this portion through the adhesive inflow groove portion 26 according to the hardening shrinkage of the adhesive in the coated housing groove 25. In this manner, it is particularly effective for a half-pitched optical fiber array that has two levels of coated optical fibers and is shown in FIGS. 4(a), 4(b), 5(a), and 5(b) to apply the adhesive 27 to the rear port of the adhesive inflow groove portion 26. This is because this type of optical fiber array needs not only a space for two levels of optical fibers but also a particularly large amount of adhesive to be used in comparison with the standard (normally-pitched) optical fiber array shown in FIGS. 3(a) and 3(b) because of the presence of a tapered portion (a bending stress reducing-portion) of the fiber that is inevitably formed by piling the fibers in two levels.

Thus, in optical fiber arrays shown in FIGS. 4(a), 4(b), 5(a), and 5(b), coated optical fibers 23a and 23b are inserted from the coated housing groove 25 formed in the coated fiber housing substrate 24 with being piled in two levels. The upper and lower fibers are aligned alternately on the V-groove. Nevertheless, as described above, the tapered portion 28 of the fiber becomes necessary because of piling the coated optical fibers 23a and 23b in two levels. Therefore, an amount of the adhesive becomes particularly large.

In addition, in the example shown in FIGS. 4(a) and 4(b), the adhesive inflow groove portion 26 is a space provided above the two levels of coated optical fibers 23a and 23b by enlarging the coated housing groove 25. In the example shown in FIGS. 5(a) and 5(b), the adhesive inflow groove portion 26 is provided in an inner side portion of the coat-housing groove 25.

Next, another form of the present invention will be described.

As described above, the amount of the adhesive in the coated housing groove portion is particularly large in comparison with the amount of the adhesive in the V-groove portion (including an upper surface of the V-groove).

By the way, in an optical fiber array, it is preferable that an adhesive for fixing the fiber on the V-groove fulfils the following requirements:

(1) Resistance to thermal fluctuation and temperature should be high, that is, so-called weather resistance should be high.
(2) Stress caused by thermal fluctuation should not be applied to the fiber.
(3) Endurance to a mechanical shock and stress (external force and a shock at the time of polishing an end face) should be present.
(4) Hardness should be equal to or more than a predetermined value (if soft, the adhesive is concave by polishing of the end face).

On the other hand, the adhesive in the coated housing groove portion is required to fulfil the following requirements:

(1) Elasticity should be equal to or more than a predetermined value (low Young's modulus) lest the bending stress of the fiber should be directly applied to a bare fiber in the V-groove portion. In addition, this has another significance of preventing the bending stress from concentrating in a part and of continuously reducing the bending stress.

(2) The adhesive should be soft so as to reduce stress since the amount of the adhesive is large and the large stress may be applied.

(3) Stress caused by thermal fluctuation should not be applied to the fiber.

(4) Resistance to thermal fluctuation and temperature should be high, that is, so-called weather resistance should be high.

Thus, in the larger interest, an adhesive that is hard in some degree is required in the V-groove portion and an adhesive that is soft in some degree is required in the coated housing groove portion.

Figure 6A:
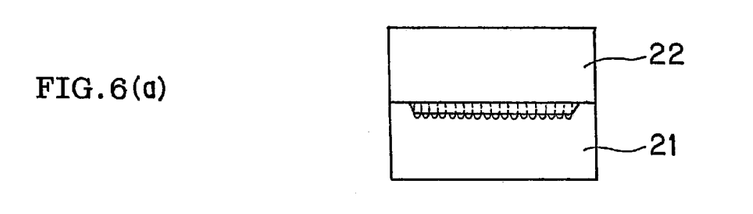
FIG. 6(a) is a left side view.
Figure 6B:
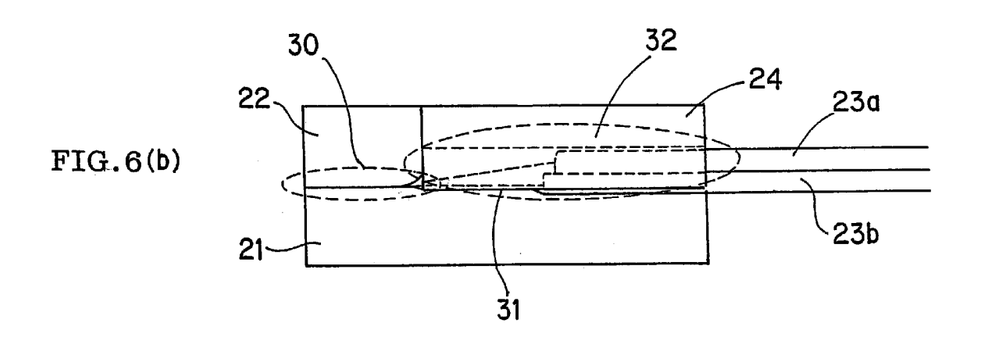
FIG. 6(b) is a front view.
Figure 6C:
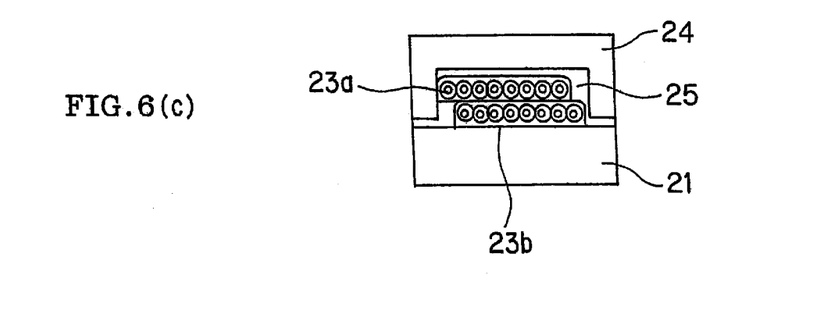
FIG. 6(c) is a right side view.

Then, in the optical fiber array of the present invention, as shown in FIGS. 6(a), 6(b), and 6(c), two kinds of adhesives, that is, a first adhesive 30 for bonding the upper substrate (fiber presser substrate) 22 and V-groove portion of the lower substrate 21 and a second adhesive 32 for bonding the coated optical fibers 23a and 23b between the coated fiber housing substrate 24 and a coated optical fiber supporting portion 31 of the lower substrate 21 are used as adhesives. In this case, important matters are Young's moduli, that is, an adhesive that has a Young's modulus that is larger than that of the second adhesive is used as the first adhesive.

In this manner, the kind of the adhesive for the adhesion of the fiber presser substrate 22 and V-groove portion is different from the kind of the adhesive for the adhesion of the coated fiber housing substrate 24 and coated optical fiber supporting portion 31. Furthermore, the first adhesive 30 having a large Young's modulus (hard) is used for the former adhesion and the second adhesive 32 having a Young's modulus smaller (soft) than that of the first adhesive 30 is used for the latter adhesion. Therefore, since the second adhesive 32 that is used in large quantities has a small Young's modulus, the hardening shrinkage is not so large. In addition, since the second adhesive 32 is soft, the residual stress is small. On the other hand, although the first adhesive 30 is hard and has large hardening-shrinkage, filled-amount is small, and hence, similarly, the residual stress is not large, and hence there is no problem.

In the above, an epoxy adhesive is preferable as the first adhesive 30. Since the epoxy adhesive has large adhesive strength and high weather resistance, the epoxy adhesive fulfils the above requirements. On the other hand, an adhesive fulfilling the above requirements is selected among acrylic or silicon adhesives and is used as the second adhesive 32.

In addition, it is preferable that the Young's modulus of the first adhesive is 2–40 kgf/mm$^2$ and the Young's modulus of the second adhesive is 0.2–2 kgf/mm$^2$.

Furthermore, the upper substrate and lower substrate that form the optical fiber array according to the present invention are composed of materials transmitting light, and for example, glass material or plastic material can be used.

EMBODIMENTS

Hereinafter, the present invention will be described further in detail on the basis of concrete embodiments.

(First embodiment: Normally-pitched optical fiber array)

Figure 7:
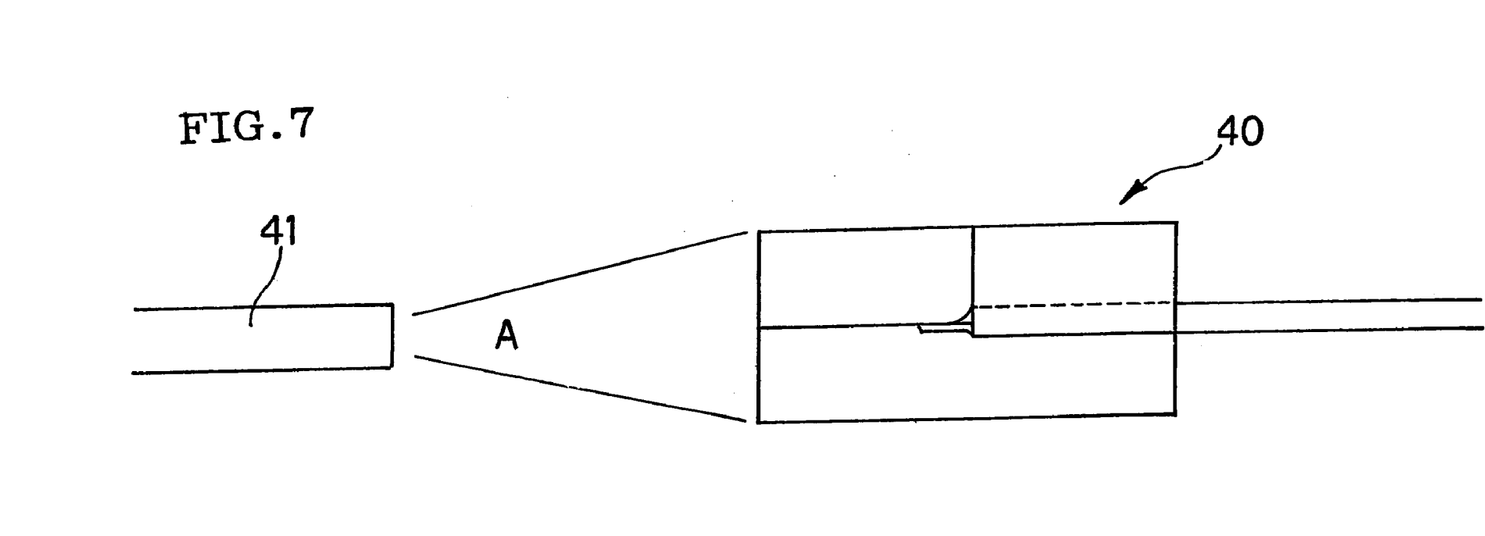
FIG. 7 is a schematic diagram showing still another embodiment of an irradiation method in an optical fiber array of the present invention.

With using a standard optical fiber array having one level of coated optical fiber, ultraviolet rays are applied as shown in FIG. 7.

Since it is few that a lot of adhesive is necessary even in the coated housing groove portion in the standard optical fiber array, reliability is regarded as an important item, and hence a kind of epoxy resin adhesive is used. This epoxy resin adhesive has the Young's modulus of 7.6 kgf/mm$^2$, hardness of 86 (Shore D hardness), and a hardening shrinkage rate of 1.88%, and is a low Young's modulus and standard hardness among the epoxy resins.

As shown in FIG. 7, with using the standard optical fiber array 40, the epoxy resin adhesive was applied from the rear portion (the right to the drawing) of the optical fiber array 40. Furthermore, after confirming that the adhesive reached an end portion (the left to the drawing) of the optical fiber array 40, ultraviolet rays were applied.

Although the hardening shrinkage of the adhesive was not so large, an ultraviolet curing unit 41 was provided on an extension line of an optical fiber axis, that is, on the extension line of the optical fiber axis in front of (the left to the drawing of) the optical fiber array 40 so as to avoid the stress caused by the hardening shrinkage. Then, ultraviolet rays were applied from the ultraviolet curing unit 41 to the optical fiber array to harden the adhesive. The luminous energy of the ultraviolet rays was 50 mW, and irradiation time was 3 minutes.

In consequence, a defect such as peeling caused by the hardening shrinkage of the adhesive or a minute bubble was not observed, and hence excellent optical fiber array could be obtained.

Furthermore, although this product (the standard optical fiber array) is examined by a high-temperature/high-humidity test under the conditions of 90%, 75° C., and two weeks, the degree of peeling progressing was good in comparison with a product made by applying ultraviolet rays from above the fiber array.

(Second embodiment: Half-pitched optical fiber array)

Figure 8A:
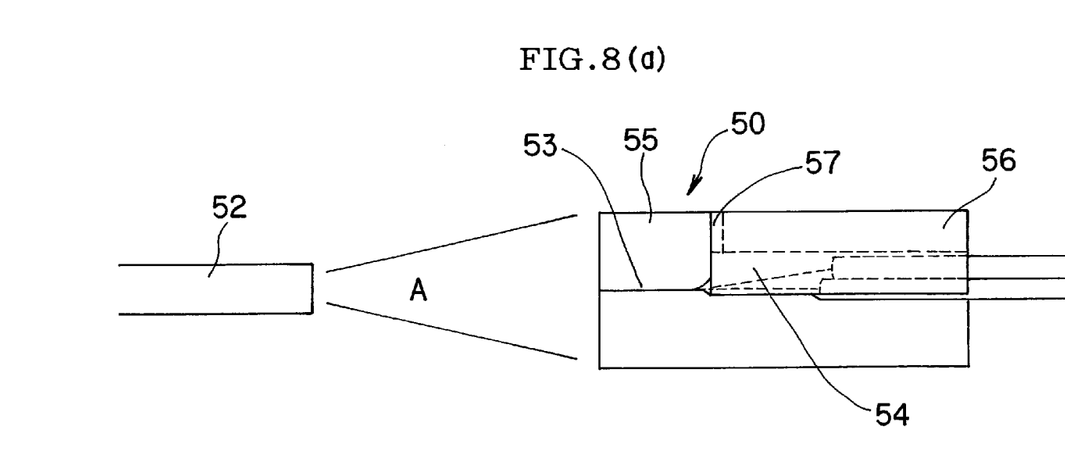
FIG. 8(a) is a front view.
Figure 8B:
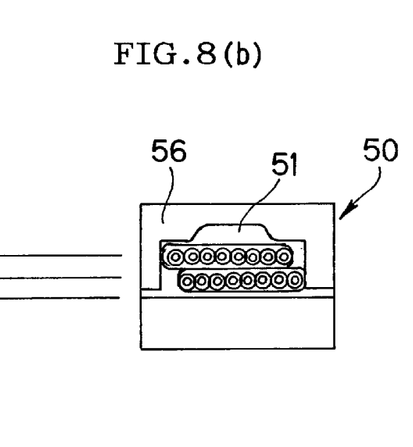
FIG. 8(b) is a right view.

With using a half-pitched optical fiber array 50 having two levels of coated optical fibers, ultraviolet rays were applied as shown in FIGS. 8(a) and 8(b).

Since a lot of adhesive is necessary in the coated housing groove portion in the half-pitched optical fiber array 50, in this embodiment, an adhesive inflow groove portion 51 was provided as shown in FIG. 8(b). As adhesives, the same epoxy resin adhesive as that in the first embodiment was used in a V-groove portion 53 of the half-pitched optical fiber array 50, and a denatured acrylate adhesive having the Young's modulus of 0.58 kgf/mm$^2$, hardness of 85 (Shore A hardness), and hardening shrinkage rate of 6.1% was used in a coat housing groove portion 54. This denatured acrylate adhesive is an elastic adhesive, and has the Young's modulus and hardness that are considerably low, and hence is a so-called soft adhesive.

As shown in FIGS. 8(a) and 8(b), with using the half-pitched optical fiber array 50, first, the epoxy resin adhesive was applied to the V-groove portion 53 from the front (the left to the FIG. 8(a) of the half-pitched optical fiber array 50. Then, the adhesive was made with using the capillary action to permeate into the inside of the V-groove. After confirming that the epoxy resin adhesive pervaded the entire V-groove portion 53, similarly to the first embodiment, ultraviolet rays were applied with an ultraviolet curing unit 52. The luminous energy and irradiation time of the ultraviolet rays was the same as those in the first embodiment.

Next, the denatured acrylate adhesive was applied from the rear portion (the right to FIG. 8(a)) of the half-pitched optical fiber array 50. At this time, by providing an air vent hole 57 in a boundary portion between a fiber presser substrate 55 and a coated fiber housing substrate 56, the denatured acrylate adhesive could pervade to an end portion of the coated housing groove 54 (or a rear end portion of the V-groove portion 53) without convoluting air.

Then, ultraviolet rays were applied from the ultraviolet curing unit 52 to the half-pitched optical fiber array 50 to sequentially harden the denatured acrylate adhesive in the coated housing groove portion 54.

In consequence, a defect such as peeling caused by the hardening shrinkage of the adhesive or a minute bubble was not observed in two kinds of adhesives in the V-groove portion and coat housing groove portion, and hence greatly excellent half-pitched optical fiber array could be obtained.

Furthermore, although this product (the half-pitched optical fiber array) is examined by a high-temperature/high-humidity test under the conditions of 90%, 75° C., and two weeks, the degree of peeling progressing was good in comparison with a product made by applying ultraviolet rays from above the fiber array.

As described above, the present invention can provide an optical fiber array, which has no loss and excellent long-term reliability by suppressing the residual stress in the optical fiber array as much as possible at the time of hardening an adhesive, and a production method thereof.

What is claimed is:

1. A production method of an optical fiber array comprising an upper substrate and a lower substrate where a V-groove is formed, the production method which comprises steps of: inserting and arranging optical fibers on the V-groove, fixing the upper substrate and the lower substrate with an adhesive, and fixing and aligning the optical fibers on the V-groove, wherein an ultraviolet hardening-type adhesive is hardened by applying ultraviolet rays to the V-groove in parallel from on an extension line of an optical fiber axis with the optical fibers being inserted and aligned between the upper and lower substrates and the ultraviolet hardening-type adhesive being injected into gaps between these upper and lower substrates and optical fibers.

2. A production method of an optical fiber array according to claim 1, wherein an ultraviolet hardening-type adhesive is hardened by applying ultraviolet rays in the direction from bare optical fibers to coated optical fibers.

3. A production method of an optical fiber array according to claim 1, wherein an optical fiber array is a half-pitched optical fiber array having two levels of coated-optical fibers.

4. A production method of an optical fiber array comprising an upper substrate, which is composed of a fiber presser substrate for pressing optical fibers on a V-groove and a coated fiber housing substrate for housing coated fibers, and a lower substrate where the V-groove is formed, the production method which comprises steps of inserting and arranging the optical fibers on the V-groove, fixing the upper substrate and the lower substrate with an adhesive, and fixing and aligning the optical fibers on the V-groove, the production method further comprising sequential steps of: inserting and arranging the optical fibers between the upper substrate and the lower substrate; injecting an ultraviolet hardening-type adhesive into gaps between these upper and lower substrate and optical fibers; and hardening the ultraviolet hardening-type adhesive by applying ultraviolet rays to the V-groove in parallel from on an extension line of an optical fiber axis.

5. A production method of an optical fiber array according to claim 4, wherein an ultraviolet hardening-type adhesive is hardened by applying ultraviolet rays in the direction from bare optical fibers to coated optical fibers.

6. A production method of an optical fiber array according to claim 2, wherein an optical fiber array is a half-pitched optical fiber array having two levels of coated-optical fibers.

7. A production method of an optical fiber array comprising an upper substrate and a lower substrate where a V-groove is formed, the production method which comprises steps of inserting and arranging optical fibers on the V-groove, fixing the upper substrate and the lower substrate with an adhesive, and fixing and aligning the optical fibers on the V-groove, the production method further comprising steps of: inserting and arranging the optical fibers between the upper substrate and the lower substrate; injecting an ultraviolet hardening-type adhesive into gaps between these upper and lower substrate and optical fibers, the ultraviolet hardening-type adhesive being composed of a first adhesive for bonding the optical fibers on the V-groove between the upper substrate and the lower substrate and a second adhesive for bonding coated optical fibers between the upper substrate and the lower substrate, the first adhesive having a Young's modulus larger than the second adhesive; and hardening the ultraviolet hardening-type adhesive by applying ultraviolet rays to the V-groove in parallel from on an extension line of an optical fiber axis.

8. A production method of an optical fiber array according to claim 7, wherein an ultraviolet hardening-type adhesive is hardened by applying ultraviolet rays in the direction from bare optical fibers to coated optical fibers.

9. A production method of an optical fiber array according to claim 7, wherein an optical fiber array is a half-pitched optical fiber array having two levels of coated-optical fibers.

10. An optical fiber array which comprises an upper substrate, a lower substrate where a V-groove is formed, and optical fibers inserted and arranged on the V-groove, the upper substrate and the lower substrate being fixed with an adhesive, and the optical fibers being fixed and aligned on the V-groove, wherein the upper substrate comprises a fiber presser substrate for pressing the optical fibers on the V-groove and a coated fiber housing substrate for housing coated optical fibers, and wherein a housing groove for coated-optical fibers and an adhesive inflow groove portion in the direction of a fiber axis are formed in the coated fiber housing substrate.

11. An optical fiber array according to claim 10, wherein the optical fiber array is a half-pitched optical fiber array having two levels of coated optical fibers.

12. An optical fiber array which comprises an upper substrate, a lower substrate where a V-groove is formed, and optical fibers inserted and arranged on the V-groove, the upper substrate and the lower substrate being fixed with an adhesive, and the optical fibers being fixed and aligned on the V-groove, wherein the adhesive is composed of a first adhesive for bonding the optical fibers on the V-groove between the upper substrate and the lower substrate and a second adhesive for bonding the coated optical fibers between the upper substrate and the lower substrate, and wherein the first adhesive has a Young's modulus larger than the second adhesive.

13. An optical fiber array according to claim 12, wherein the optical fiber array is a half-pitched optical fiber array having two levels of coated optical fibers.

14. An optical fiber array which comprises an upper substrate, a lower substrate where a V-groove is formed, and optical fibers inserted and arranged on the V-groove, the upper substrate and the lower substrate being fixed with an adhesive, and the optical fibers being fixed and aligned on the V-groove, wherein the upper substrate comprises a fiber presser substrate for pressing the optical fibers on the V-groove and a coated fiber housing substrate for housing the coated optical fibers, wherein the adhesive is composed of a first adhesive for bonding the fiber presser substrate and the lower substrate and a second adhesive for bonding the coated optical fibers between the coated fiber housing substrate and the lower substrate, and wherein the first adhesive has a Young's modulus larger than the second adhesive.

15. An optical fiber array according to claim 14, wherein the optical fiber array is a half-pitched optical fiber array having two levels of coated optical fibers.

* * * * *